March 16, 1954 J. E. ALBRIGHT 2,672,502

COLOR-SELECTIVE OPTICAL SYSTEM

Filed Oct. 19, 1950 2 Sheets-Sheet 1

INVENTOR
James E. Albright
BY
[signature]
ATTORNEY

INVENTOR
James E. Albright
BY
[signature]
ATTORNEY

Patented Mar. 16, 1954 2,672,502

UNITED STATES PATENT OFFICE 2,672,502

COLOR-SELECTIVE OPTICAL SYSTEM

James E. Albright, Haddon Township, Camden County, N. J., assignor to Radio Corporation of America, a corporation of Delaware Application October 19, 1950, Serial No. 191,068

19 Claims. (Cl. 178—5.4)

This invention relates to color television systems. It has particular reference to an optical system for selectively combining a plurality of component color images in substantially exact registration.

In many types of color television systems, the different component color images are separately reproduced. In order to make a composite image it is necessary to employ an optical system suitable to effectively superimpose the different component color images. The superimposition of the component color images must be effected in sufficiently good optical registration that the composite image may have the appearance of the original subject.

One optical system which has been employed quite successfully for such a purpose includes one or more color-selective devices which are known as dichroic reflectors. Such apparatus has the property of reflecting light of a predetermined color and, at the same time, of transmitting without substantial modification light of a different color. Representative examples of dichroic reflectors are disclosed in two U. S. patents to Glenn L. Dimmick. These are 2,379,790, granted July 3, 1945, and titled "Dichroic Reflectors" and 2,412,496, granted December 10, 1946, and titled "Color Selective Reflector."

Essentially a dichroic reflector, of the type shown in the two Dimmick patents referred to, consists of a transparent support upon which is mounted a color-selective layer. This layer is a reflector for light of a selected color and is essentially transparent to light of non-selected colors.

Heretofore in color television systems using dichroic reflectors, each of the reflectors has been arranged in such a manner that one surface of the transparent support is provided with the color-selective reflective layer. The layer has been located on that surface of the support which is nearest to the source of light of the color to be reflected. As a result, the light to be reflected did not have to traverse the transparent support. However, the colored light which was to be transmitted through the reflective layer did have to pass through the transparent support.

Systems of this character, as used previously, have been effective to combine the different component color images in reasonably good registration so long as relatively small viewing angles were used. In general, such systems are satisfactory for viewing angles which do not exceed plus or minus five degrees from a central position. The registration of a combined color television image is not entirely satisfactory for any greater viewing angles.

Accordingly, it is an object of this invention to provide an improved, wide angle optical system having one or more color-selective components and in which good registration of the component color images is effected.

Another object of the invention is to provide an improved arrangement of dichroic reflectors whereby to effect good registration of a plurality of component color images at relatively wide angles of view.

Still another object of the invention is to provide an improved wide angle optical system comprising one or more dichroic reflectors for use in an image-reproducing color television system.

In accordance with the present invention, the improved arrangement of dichroic reflectors is one which produces light paths between the respective sources of the component color images and a predetermined plane which are substantially identical in length and character. All of the colored light is required to travel partly through air and partly through glass, or other transparent medium having an index of refraction different from that of air. The arrangement of the dichroic reflectors is such that light of all colors is required to travel through equal distances in air and in higher refractive media. In general, this beneficial result is obtained by disposing one or more of the dichroic reflectors so that the color-reflective layer is separated from the source of the light which it is to reflect by a polychromatic light-transmitting member. In this way the reflected, as well as the transmitted, light is required to traverse the transparent member. Such an arrangement effectively equalizes the length and character of the paths of the reflected light and the light transmitted by the dichroic reflector.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figures 1, 2:
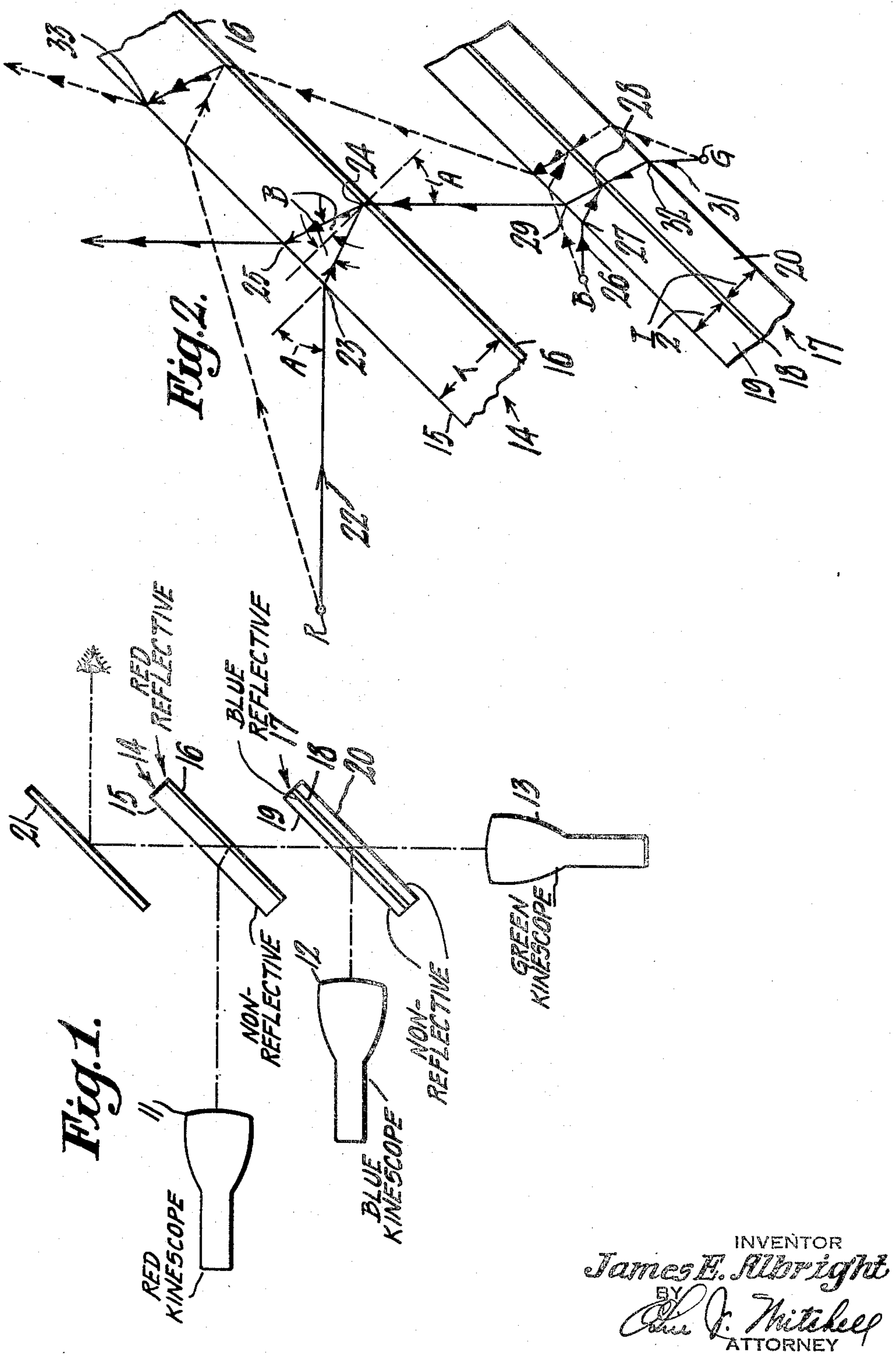
Figure 1 is an embodiment of the color-selective optical system in accordance with this invention for a directly viewed television reproducing apparatus.
Figure 2 is a fragmentary view, to an enlarged scale, of the dichroic reflectors of Figure 1, illustrating the manner in which the present invention operates.

Reference first will be made to Figure 1 of the drawings. The three sources of differently colored image-representative light are shown as red, blue and green kinescopes 11, 12 and 13 respectively. Since the apparatus required to produce the different component color images upon the kinescopes forms no part of the present invention and may be conventional, it has not been shown. It will be understood nevertheless that, upon the respective luminescent screens of the kinescopes 11, 12 and 13 there are produced, substantially concurrently, red, blue and green component color television images.

The partial television image formed on the screen of the red kinescope 11 is directed so that it is intercepted by a dichroic reflector 14. As disclosed in the two Dimmick patents referred to, the dichroic reflector 14 comprises a substantially transparent support 15 upon one surface of which is formed a red-reflective layer or coating 16. Blue and green light is transmitted by this coating without substantial modification. The support 15 may be of glass or other suitable transparent material such as a good grade of clear plastic substance. In any case, it will be noted that the red-reflective coating 16 is formed on that surface of the support 15 which is remote from the red kinescope 11. Such an arrangement is one of the features of the present invention. Previously, the colored light-reflective coating has been formed on the surface of the support which is adjacent to the source of the light to be reflected. In the present instance, the surface of support 15 which is closest to the kinescope 11 is treated so that it is non-reflective. For example, this surface may be treated as taught in U. S. Patent 2,397,929, granted April 4, 1946, to G. L. Dimmick and titled "Reduction in Reflection from Glass." Also, as usually arranged, the dichroic reflector 14 is disposed substantially at 45 degrees relative to the face of the red kinescope 11.

Also, associated with the blue and green kinescopes 12 and 13, there is provided another dichroic reflector 17. In this case, a blue-reflective coating 18 is provided between a pair of transparent optical members or supports 19 and 20. The outside surfaces of the members 19 and 20 are treated so as to render them non-reflective. In accordance with this invention, the total thickness of the dichroic reflector 17 is substantially equal to the total thickness of the dichroic reflector 14. The blue kinescope 12 is mounted in relation to the dichroic reflector 17 similarly to the manner in which the red kinescope 11 is arranged with respect to the dichroic reflector 14. The green kinescope 13 is mounted substantially vertically, as shown, so that it is in alignment with both of the dichroic reflectors 14 and 17.

In order that the light images of different colors from the three kinescopes 11, 12 and 13 may be superimposed for observation, there is provided a plane mirror or reflector 21 mounted substantially in alignment with the dichroic reflectors 14 and 17.

In general, the optical system as described functions somewhat similarly to those previously used. The dichroic reflector 14 reflects upwardly, as viewed in the drawing, the red light derived from the kinescope 11. This reflector also transmits upwardly toward the mirror 22 without substantial modification, blue and green light respectively from kinescopes 12 and 13. The blue-selective dichroic reflector 17 functions to reflect blue light derived from the kinescope 12 so that it is directed upwardly. Also, the dichroic reflector 17 transmits, without substantial modification green light derived from the kinescope 13. Accordingly, an observer looking into the mirror 21 is able to see the three partial images in red, blue and green colors produced by the kinescopes 11, 12 and 13, respectively. Furthermore, by suitably positioning the optical components including the dichroic reflectors 14 and 17 with respect to the kinescopes, the three colored images may be seen substantially in good optical registration with one another.

One of the requirements for registering the three colored images is that the different light paths from the respective kinescope screens to the observer be substantially equal in length. In general, this requirement may be met by mounting the kinescopes at suitably different distances from the dichroic reflectors. Such an arrangement is well known to those skilled in the art. However, such an arrangement is capable of providing substantially good registration of the three component color images only if viewed within a comparatively small angle of the order of magnitude of plus or minus five degrees from a central position. The present invention, however, takes into account, not only the equalization of the length of the light paths from the different kinescopes but also the equalization of the thicknesses of the different media through which the light travels in the different paths. By making these factors substantially identical for all of the light paths, in accordance with this invention, the component color images may be viewed from substantially any angle. Moreover substantially exact optical registration of these images will be effected.

For a more detailed explanation of the manner in which this feature of the invention is accomplished, reference now will be made to Figure 2.

Fragmentary cross-sectional portions ofthe red and blue selective dichroic reflectors 14 and 17, respectively, are shown to a considerably enlarged scale. For the purpose of this description only one point on the different kinescope screens will be considered. Corresponding points on the three kinescopes have been chosen. These are designated as points R, B and G, located respectively on the screens of the red, blue and green kinescopes 11, 12 and 13. Two paths of light from each of the points are traced. These two light paths are representative of different angles from which the reproducing apparatus may be viewed. It is not intended that the two paths chosen for illustration are the limiting angles of view, but merely as representative of the manner in which the present invention operates.

From a first angle of view, the path of light from the red point R is represented by the open arrow heads such as 22 on the full lines. It will be seen that the red light path intersects the non-reflecting surface of the dichroic reflector support 15 at a point 23. In accordance with the index of refraction of the support, the light path is altered as it traverses the support so that it impinges upon the red-reflective coating 16 at a point 24. The red light is reflected and emerges from the dichroic reflector support 15 at a point 25. It is to be noted that the red light path traverses the support 15 twice.

Consider now the path of light from the blue point B. From the assumed angle of view, this light path is represented by the solid arrow heads such as 26 on the full lines. The blue light path intersects the non-reflecting surface of the support 19 at a point 27. The direction of the light path is changed through the denser medium of the support so that it impinges upon the blue-reflective coating 18 at a point 28. The blue light is reflected and emerges from the dichroic reflector support 19 at a point 29 and continues generally upwardly to intersect the blue dichroic reflector 14 at the point 24. It then follows the same path as the light from the red point R, finally emerging from the dichroic reflector 14 at the point 25.

Similarly, the light path from the green point G is represented by the half-solid arrow heads such as 31 on the full lines. The green light path intersects the non-reflecting surface of the support 20 at a point 32. The direction of the green light path is changed through the denser medium of the support so that it intersects the blue-reflective coating 18 at the point 28. It then follows the same path as the blue and red light, finally emerging from the dichroic reflector 14 at the point 25.

Inasmuch as the points R, B and G are representative of all other points on the screens of the red, blue and green kinescopes 11, 12 and 13, respectively, it will be appreciated that the three component color images will be viewed simultaneously and in substantially exact optical registration.

As illustrative of another angle of view, the paths of light from the selected points R. B and G are represented by the broken lines emanating from these points. Different colors of the light in the different portions of these paths again are represented by the different arrow heads. Without tracing in detail each of the representative paths of light from the three different sources it may be seen that they all emerge finally from the dichroic reflector 14, at a point 33. Also, it will be noted that, again, the light from the three different sources is in substantially exact optical registration.

The registration of the three color images from substantially any angle of view is effected in accordance with the present invention by the proper arrangement of the dichroic reflectors relative to the observer and to the kinescopes. If the thickness of the support 15 of the dichroic reflector 14 is represented as T, then the thickness of the supports 19 and 21 of the dichroic reflector 17 each should be substantially equal to $$\frac{T}{2}$$

Such structural parameters, together with the described disposition of the color-selective coatings on the supports relative to the sources of light, are the essential features of the present invention by which the wide angle optical registration of the images is secured.

The light path from the red point R, for example, includes a portion through a medium which is more dense than air. This medium comprises the support 15 of the dichroic reflector 14. It will be noted that the red light twice traverses the support 15 of thickness T. Also, the light path from the point R makes an angle A with the normal to the support surface at point 23. Since the support 15 is a light-transmitting medium having a density greater than air, the red light path is altered through the support 15, making an angle B with a normal to the surface of the support. If N is the index of a fraction of the support 15, then $$\sin B = \frac{\sin A}{N}$$

Also, the path of red light after reflection by the coating 16 at the point 24 makes an angle B with the normal. Consequently, the distance traveled through the support 15 between the entrance point 23 and the emergence point 25 is equal substantially to $$\frac{2T}{\cos B}$$

Consider now the path through the dichroic reflector 17 of the blue light from the point B. It intersects the surface of the dichroic reflector support 19 at the point 27 at substantially the same angle as the red light previously described. In this case, however, the blue-reflective coating 18 is located between the supports 19 and 20. The thickness of each of these supports is equal substantially to $$\frac{2}{T}$$

where T is the thickness of the red reflector support 15. Consequently, the length of the blue light path through the support 19 between the entrance point 27 and the emergence point 29 is equal substantially to $$\frac{T}{\cos B}$$

Also, the blue light path through the red dichroic support 15 from the entrance point 24 to the emergence point 25 is equal substantially to $$\frac{T}{\cos B}$$

Consequently, it is seen that the total length of the blue light path through the supports 19 and 15 is equal substantially to $$\frac{2T}{\cos B}$$

This corresponds with the length of the red light path through the dichroic support 15.

In substantially the same manner it may be seen that the light from the green point G, in traversing the supports 19 and 21 of the dichroic reflector 17, has a length equal substantially to $$\frac{T}{\cos B}$$

The length of the green path, between the entrance and the emergence points of the red dichroic support also is equal to $$\frac{T}{\cos B}$$

The total distance of the green light path through the dichroic supports 15, 19 and 20, therefore, is equal substantially to $$\frac{2T}{\cos B}$$

It is evident, therefore, by means of the present design and arrangement of the dichroic reflectors, that the length of the differently colored light paths through the light reflector supports may be made substantially equal. The lengths of the different light paths in air may be equalized in the usual manner. Accordingly, it is seen that, not only are the different light paths equalized in length, but also the distances traveled in the different media are equalized. Accordingly, proper optical registration of the three component color images may be effected for substantially any angle of view.

Figures 3, 4:
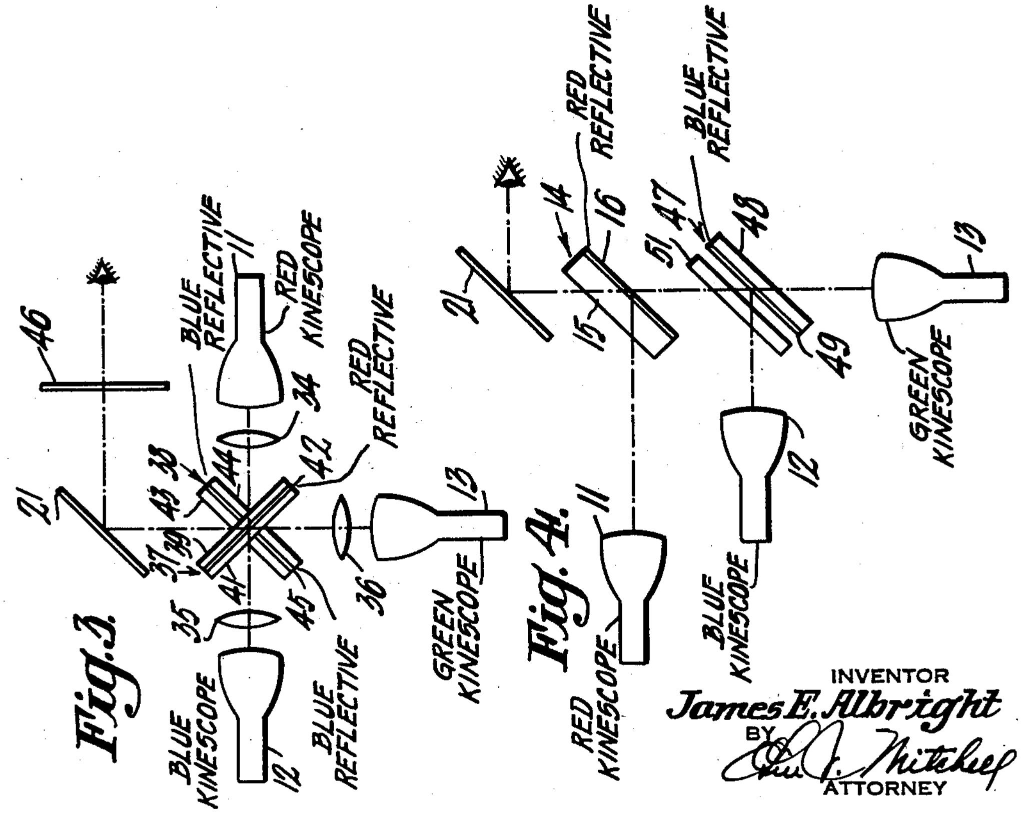
Figure 3 is another embodiment of the invention in a projection type of television image-reproducing system.
Figure 4 shows another embodiment of the invention in a directly viewed television image-reproducing apparatus.

Referring now to Figure 3 of the drawings, there is shown an arrangement of dichroic reflectors in accordance with the present invention which may be used advantageously in a projection type of a television image-reproducing system. In this case, the red, blue and green kinescopes 11, 12 and 13, respectively, are arranged substantially at right angles to one another as shown. The kinescopes 11, 12 and 13 are provided with optical projection systems represented at 34, 35 and 36 respectively. It will be understood that the projection systems diagrammatically shown herein may be of any desired type. For example, a reflective type of system such as the well-known Schmidt system may be employed advantageously. The projection systems direct the light from their associated kinescopes to an arrangement of crossed dichroic reflectors 37 and 38. The dichroic reflector 37, for example, may consist of transparent supports 39 and 41 between which there is provided a red-reflective coating. The dichroic reflector 37 may be substantially of the same general character as the reflector 17 of Figures 1 and 2. The dichroic reflector 38 comprises a pair of transparent supports 43 and 44 between which there is provided a blue-reflective coating 45. The reflector 38 also may be of the same general character as the reflector 17. In this case, however, it is made into parts mounted respectively on opposite sides of the reflector 37. The light derived from the crossed dichroic reflectors 37 and 38 is directed onto the plane reflecting mirror 21 and thence to a viewing screen 46. The outside surfaces of the transparent supports 39, 41, 43 and 44 are made non-reflective.

In general, the operation of the crossed dichroic reflector system is similar to those previously used. The red light derived from the kinescope 11 is reflected by the coating 42 of the dichroic reflector 37. Blue and green lights are transmitted without substantial modification through the dichroic reflector 37. Blue light derived from the kinescope 12 is reflected by the coating 45 of the dichroic reflector 38. This reflector is capable of transmitting, without substantial modification, red and green light. The green light derived from the kinescope 13 is transmitted without substantial modification through both of the reflectors 37 and 38.

As in the previously described modification of the present invention, each of the dichroic reflectors 37 and 38 embodies the present invention. The light-reflective coating is located substantially at the center of each of the reflectors. In this way the light which is reflected, as well as that which is transmitted, by each of the dichroic reflectors is made to travel substantially the same distance through the transparent supporting structure. Again, this arrangement of the dichroic reflectors provides, not only substantially equal length light paths from the different sources, but also paths which are substantially identical in the character of the media traversed.

It will be appreciated that the dichroic reflector 14 of Figure 1, in itself, is not the substance of the present invention, particularly as used in the prior art. As previously used, this reflector conventionally is mounted with the color-selective reflective coating 16 adjacent to the source from which the light to be reflected is derived. In accordance with this invention, the reflector 14 is inverted to place this coating remote from the light source. However, the dichroic reflector 17 is of a somewhat special character. It may be formed in two general steps. In the first step, either the support 19 or 21 is processed to receive the color-reflective coating 18 in the usual way. In the second step, the other one of the supports is cemented or otherwise suitably bonded, to the reflective coating 18. It is necessary, of course, to provide each of the supports 19 and 21 with a thickness equal substantially to one-half of the thickness of the support 15 of the dichroic reflector 14.

In case that it is not desired to employ a dichroic reflector of the type corresponding to the reflector 17 of Figure 1, an arrangement such as that shown in Figure 4 may be used. In this case the red-reflective dichroic reflector 14 is a conventional device arranged in an inverted manner in accordance with this invention. The blue-reflective dichroic reflector 47, however, consists of a support 48 having a thickness which is equal substantially to one-half of the thickness of the reflector 14 and a blue-reflective coating 49 formed on the surface of the support which is adjacent to the blue kinescope 12. In order that the light paths from the kinesccopes 11, 12 and 13 may be equalized, in accordance with the present invention, there also is provided a transparent optical member, such as a plate 51, having a thickness equal substantially to one-half of the thickness of the support 14. The plate 51 is mounted in spaced relation to the dichroic reflector 47, between it and the blue kinescope 12. The spacing between the plate 51 and the dichroic reflector 47 is not critical. As in previously described embodiments of the invention, all surfaces of the optical members 15, 48 and 51 which are not coated for colored light reflection are treated for non-reflection.

It will be seen that the blue light from the kinescope 12 travels a path having the same length in air from the kinescope screen to the reflective coating 49 as in the embodiment of the invention shown in Figure 1. Furthermore, the blue light travels the half thickness plate 51 twice and the full thickness support 14 once. The green light from the kinescope 13 also travels through the two half thickness members 48 and 51 and the full thickness support 15. The red light, as in the previous instance, travels through the full thickness support 15 twice. Thus, light from all of the kinescopes travels a total distance through the denser-than-air media equal substantially to $$\frac{2T}{\cos B}$$

where T is the thickness of the support 15, used in the example described in connection with Figure 2.

It has been found that a somewhat simplified embodiment of the invention may be used in cases where perfect registration of the blue image with the red and green images through all viewing angles is not required. In this case, the red dichroic reflector 14 is arranged in the manner previously described. The blue dichroic reflector 52 is arranged in a conventional way. The support 53 of the blue dichroic reflector 52 has a thickness which is equal to that of the support 15 of the red dichroic reflector 14. The surface of the support 53 which is adjacent to the blue kinescope 12 is provided with a blue-reflective coating 54.

It may be seen that the red light traverses the full thickness support 15 twice, as in the previously described embodiments of the invention. Also, the green light from the kinescope 13 traverses the full thickness support 53 of reflector 52 and also the full thickness support 15 of reflector 14. Accordingly, there is substantially exact registration between the red and green images for all angles of view. The blue light, derived from the kinescopes 12, however, passes through only one thickness of a medium which is more dense than air, e. g. the support 15 of the red-reflective dichroic reflector 14. Accordingly, there is some mis-registration between the blue image and the red and green images at large viewing angles. However, in many cases, it is not objectionable since the acuity of the average observer for the blue image is somewhat less than for the red and green images.

A somewhat different embodiment of the invention is disclosed in Figure 6 to which reference now will be made. This form of the invention is another color television image-reproducing system which may be directly viewed. The red, blue and green kinescopes 11, 12 and 13 are arranged substantially in the same manner as in the forms of the invention shown in Figures 1, 4 and 5. The color-selective optical system for combining the images produced by the kinescopes comprises dichroic reflecting elements 55 and 56. The dichroic reflector 55 is arranged to receive red light from one direction and blue and green light from another direction and to direct it toward an observer. The dichroic reflector 56 is arranged to receive blue and green light from different directions and to direct it toward the dichroic reflector 55.

The dichroic reflector 55 is provided with a color-selective layer 57 mounted between two transparent optical members constituting supports 58 and 59. The color-selective layer 57 is capable of reflecting blue and green light and of transmitting red light. The thickness of the support 59 should be substantially equal to one-third of that of the support of 58. Using the same parameters referred to in other forms of the invention described, the thickness of the support 59 is $$\frac{T}{2}$$

and the thickness of the support 58 is $$\frac{3T}{2}$$

making the total over-all thickness of the dichroic reflector 55 equal to 2T.

The dichroic reflector 56 is of the same general type as the dichroic reflector 17 of Figure 1. It comprises a color-selective layer 61 which is capable of reflecting blue light and of transmitting green light. The color-selective layer is mounted between two transparent optical members forming supports 62 and 63. In this form of the invention, the color-selective layer is mounted substantially equidistant from the outside surfaces of the supports. Also, the thickness of each of the supports 62 and 63 is equal to $$\frac{T,}{2}$$

in which case the total over-all thickness of the dichroic reflector 56 is equal substantially to T.

Figures 5, 6:
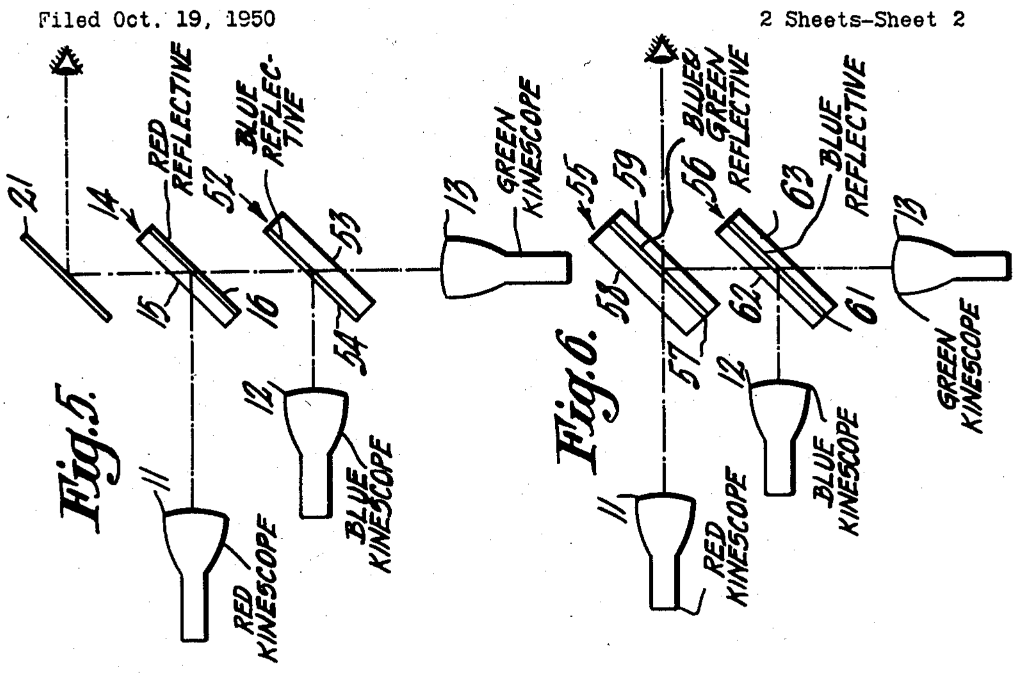
Figure 5 shows still another modified form of the invention adapted for use in a directly viewed television image-reproducing apparatus.
Figure 6 shows an embodiment of the invention for direct viewing in which one of the dichroic elements is dual-reflective.

The embodiment of the invention shown in Figure 6 operates in a slightly different manner from any of the previously described embodiments. Blue light from the kinescope 12 is reflected by the dichroic element 56 and is directed upwardly in combination with the green light derived from the kinescope 13. The green light is transmitted by this dichroic element in substantially exact register with the blue light. The combined blue and green images then are reflected by the dichroic element 55 in substantially exact optical register with the red image derived from the kinescope 11. The composite color television image may be viewed by looking directly at the dichroic reflector 55.

It will be noted that, in this form of the invention, there is no need for a plane mirror such as the mirror 21 of Figures 1, 3, 4, and 5. It will be appreciated that this mirror also may be omitted from the forms of the invention shown in these other figures if desired. The purpose of a reflector of this type is to enable viewing of the picture from a more suitable angle which will enable the achievement of a more compact mechanical design of the equipment. It will be understood, therefore, that in the other forms of the invention previously described the plane reflector or mirror may be omitted if desired.

It may be seen from the relative dimensions of the dichroic reflectors 55 and 56 given in the foregoing description, that the light paths from the different kinescopes to the observer satisfy all of the requirements for substantially exact optical registration of the component color images through substantially any viewing angle. The distance traveled by the red light derived from the kinescope 11 through the dichroic reflector 55 is seen to be substantially equal to $$\frac{2T}{\cos B}$$

where B is the angle made by the light path with a normal to the surface of the supports 58 and 59. In a like manner, it is seen that the length of the blue light path in the dichroic reflector 56 is equal substantially to $$\frac{T}{\cos B}$$

by twice traversing the support 62. Similarly, the blue light path in the dichroic reflector 55 includes two traversals of the support 59 and, therefore, is equal substantially to $$\frac{T}{\cos B}$$

Accordingly, the total length of the blue light path in the dichroic reflectors 55 and 56 is equal substantially to $$\frac{2T}{\cos B}$$

which is the same as the length of the red light path through the dichroic reflector 55.

The green light path tranverses the supports 62 and 63 of dichroic reflector 56. Consequently, the length of this path through this element is equal substantially to $$\frac{T}{\cos B}$$

Also, as with the blue light, the length of the green light path through the support 59 of the dichroic reflector 55 is equal substantially to $$\frac{T}{\cos B}$$

The total distance of the green light path through the dichroic elements 55 and 56, therefore, is equal substantially to $$\frac{2T}{\cos B}$$

It is seen that the length of the light paths of the different component color images all are substantially equal through the denser-than-air media comprising the dichroic reflector supports. As in other forms of the invention, the kinescopes 11, 12 and 13 are assumed to be suitably spaced from the dichroic reflectors 55 and 56 so that there is substantial equality in the length of the light paths through air from the respective light sources to the observer. Accordingly, the system embodies the underlying principles of this invention, whereby to effect substantially exact optical registration of the plurality of component color images.

The foregoing disclosure of several representative embodiments of the invention demonstrates the underlying principles of the invention. It now may be seen that an arrangement of the dichroic reflectors relative to the differently colored light sources and to an observer provides light paths which are all of the same length and which are all of the same character with respect to the different media traversed by the light. This result is achieved by arranging the reflective coatings of the dichroic reflectors in such a way that the light to be reflected traverses the transparent support for substantially the same distance as the light which is to be transmitted by the reflector.

Modifications of the invention other than the illustratively disclosed embodiments thereof will occur to those skilled in the art. The scope of the invention embodying the foregoing principles is set forth in the following claims.

What is claimed is:

1. In a color-selective optical system for combining images derived from a plurality of sources of light of different colors, dichroic reflecting apparatus disposed to receive from different directions light from two of said sources, said dichroic apparatus including a color-selective layer of a material capable of transmitting light of at least one particular one of said colors and of reflecting light of at least another particular one of said colors, and a transparent optical member capable of transmitting substantially indiscriminately light of both of said particular colors and having at least a portion thereof located between said color-selective layer and the source of light reflected by said layer, whereby light of both of said particular colors is caused to traverse said transparent optical member.

2. Dichroic reflecting apparatus as defined in claim 1, wherein said color-selective layer and said optical member form a unitary structure.

3. Dichroic reflecting apparatus as defined in claim 1, wherein said color-selective layer is disposed in spaced relation to both surfaces of said optical member.

4. Dichroic reflecting apparatus as defined in claim 1, wherein said color-selective layer is disposed on a surface of said optical member.

5. Dichroic reflecting apparatus as defined in claim 1, wherein said color-selective layer is separated from both of said light sources by said optical member.

6. In a color-selective optical system, respective sources of light of two different colors, and a dichroic reflector disposed to receive from different directions light from said respective sources, said reflector comprising a support of a transparent material capable of transmitting substantially indiscriminately light of both of said colors, and a color-selective layer of a material capable of transmitting light of one of said colors and of reflecting light of the other of said colors, said color-selective layer being disposed on said support in spaced relation to that surface of said support which is adjacent to said source of reflected light, whereby light of both of said colors is caused to traverse said transparent support.

7. In a color-sensitive optical system defined in claim 6, a dichroic reflector wherein said color-sensitive layer is on that surface of said support which is adjacent to said source of transmitted light.

8. In a color-sensitive optical system as defined in claim 6, a dichroic reflector wherein said color-sensitive layer is mounted between both outside surfaces of said support.

9. In a color-sensitive optical system as defined in claim 6, a dichroic reflector wherein said color-sensitive layer is mounted between and, substantially equidistant from, both outside surfaces of said support.

10. In a color-sensitive optical system as defined in claim 6, a dichroic reflector wherein said color-sensitive layer is mounted between both outside surfaces of said support and closer to one than to the other of said outside surfaces.

11. In a color-sensitive optical system as defined in claim 6, a dichroic reflector wherein said color-sensitive layer is mounted between both outside surfaces of said support and at a distance from one of said surfaces which is equal substantially to one-third of its distance from the other of said surfaces.

12. In a color television system including respective sources of a plurality of different component color images, dichroic reflecting apparatus for combining said images in substantially exact registration, said dichroic reflecting apparatus comprising a first dichroic reflecting element disposed to receive two of said component color images from different directions, a second dichroic reflecting element disposed to receive a combination of said two component color images from said first reflecting element and a third component color image from a third one of said sources, each of said dichroic reflecting elements including a color-sensitive layer of a material capable of transmitting light of a particular one or a combination of two or more of said colors and of reflecting light of another particular one or a combination of two or more of said colors, and a transparent optical member capable of transmitting substantially indiscriminately light of any of said colors, said optical member in at least one of said dichroic reflecting elements being located between said color-selective layer and the source of image light to be reflected by said layer, whereby both the light which is reflected and the light which is transmitted by said dichroic reflecting element are caused to traverse said transparent optical member.

13. In a color television system as defined in claim 12, dichroic reflecting apparatus wherein both of said dichroic reflecting elements have the transparent optical members located between the respective color-selective layers and the respective sources of component color images reflected by said layers.

14. In a color television system as defined in claim 12, dichroic reflecting apparatus wherein one of said dichroic reflecting elements has the color-sensitive layer disposed on that surface of said transparent optical member which is adjacent to the source of the component color image to be transmitted by said dichroic reflecting element, and another one of said dichroic reflecting elements has the color-sensitive layer mounted between the two outside surfaces of said transparent optical member.

15. In a color television system as defined in claim 12, dichroic reflecting apparatus wherein said first and second dichroic reflecting elements have the respective color-sensitive layers mounted between the two outside surfaces of the associated transparent optical members.

16. In a color television system in accordance with claim 12, dichroic reflecting apparatus wherein one of said dichroic reflecting elements has the color-sensitive layer mounted on the surface of said transparent optical member which is adjacent to the source of the component color image to be transmitted and the other of said dichroic reflecting elements has the color-sensitive layer mounted on that surface of an additional transparent optical member which is remote from the source of the component color image to be transmitted, and in which said first-mentioned transparent optical member is mounted in spaced relation to its associated color-sensitive layer on the side thereof adjacent to the source of component color image to be reflected by said layer.

17. In a color television system in accordance with claim 12, dichroic reflecting apparatus wherein the color-sensitive layers are mounted respectively on outside surfaces of said transparent optical members, said first dichroic reflecting member having the color-sensitive layer on that surface of its associated transparent optical member which is remote from the source of the component color image to be transmitted, and the color-sensitive layer of said second dichroic reflecting element being on that surface of its associated transparent optical member which is remote from the source of the component color image to be reflected.

18. In a color television system in accordance with claim 12, dichroic reflecting apparatus wherein one of said dichroic reflecting elements has the color-sensitive layer mounted between and substantially equidistant from both outside surfaces of its associated transparent optical members and is capable of reflecting one of said component color images and of transmitting another of said component color images, and the other of said dichroic reflecting elements has the color-sensitive layer mounted between both outside surfaces of its associated transparent optical member at a distance from that surface which is adjacent to said one dichroic reflecting element which is equal substantially to one-third of the distance from the other of said surfaces and is capable of reflecting both component color images received from said one dichroic reflecting element and of transmitting a third one of said component color images.

19. In a color-selective optical system for color television reproduction by three kinescopes operative respectively to produce red, blue and green component color television images, component color image-combining apparatus including a dichroic reflector comprising a support of a material capable of transmitting without substantial discrimination light of all of said component colors and a color-selective layer of a material capable of transmitting blue and green light and of reflecting red light, said red-reflective layer being disposed on the surface of said support which is remote from said red image-producing kinescope, a second dichroic reflector disposed in spaced relationship with said first reflector and in position to receive on the opposite surfaces thereof blue and green light respectively from said blue and green image-producing kinescopes, said second reflector comprising two elements capable of transmitting without substantial discrimination blue and green light and a layer of a material capable of transmitting green light and of reflecting blue light mounted intermediate of adjacent surfaces of said light transmitting elements, both of said dichroic reflectors being disposed relative to one another and to the respective kinescopes in a manner, whereby light of all colors follow paths of substantially equal length and include substantially the same character of media.

JAMES E. ALBRIGHT.

References Cited in the file of this patent

UNITED STATES PATENTS

| Number | Name | Date |
|---|---|---|
| 2,335,180 | Goldsmith | Nov. 23, 1943 |
| 2,379,790 | Dimmick | July 3, 1945 |
| 2,412,496 | Dimmick | Dec. 10, 1946 |